United States Patent
Tan et al.

(10) Patent No.: US 7,848,038 B1
(45) Date of Patent: Dec. 7, 2010

(54) BOOSTED WRITE DRIVER FOR TRANSMISSION LINE WITH REDUCTION IN PARASITIC EFFECT OF PROTECTION DEVICES

(75) Inventors: Kien Beng Tan, Singapore (SG); Xiao Yu Miao, Singapore (SG)

(73) Assignee: Marvell International Ltd., Hamilton (BM)

( * ) Notice: Subject to any disclaimer, the term of this patent is extended or adjusted under 35 U.S.C. 154(b) by 487 days.

(21) Appl. No.: 11/900,945

(22) Filed: Sep. 14, 2007

Related U.S. Application Data

(60) Provisional application No. 60/826,260, filed on Sep. 20, 2006.

(51) Int. Cl.
*G11B 5/09* (2006.01)
(52) U.S. Cl. .......................................... 360/46
(58) Field of Classification Search ............... 360/46, 360/68, 75
See application file for complete search history.

(56) References Cited

U.S. PATENT DOCUMENTS

| | | | |
|---|---|---|---|
| 4,564,896 A * | 1/1986 | Akerson | 363/56.06 |
| 5,018,042 A * | 5/1991 | Williston et al. | 361/42 |
| 6,130,563 A * | 10/2000 | Pilling et al. | 327/111 |
| 7,006,313 B2 | 2/2006 | Ngo | 360/46 |
| 7,035,028 B2 | 4/2006 | Venca et al. | 360/46 |
| 7,107,868 B2 * | 9/2006 | Yone | 74/335 |
| 7,183,813 B2 * | 2/2007 | Kasanyal et al. | 327/65 |
| 7,242,249 B2 * | 7/2007 | Dreps et al. | 330/254 |
| 2005/0152206 A1 | 7/2005 | Barnett et al. | 360/230.06 |
| 2006/0203372 A1 | 9/2006 | Yuuki et al. | 360/68 |
| 2007/0002954 A1 | 1/2007 | Cornelius et al. | 375/257 |

* cited by examiner

*Primary Examiner*—Fred Tzeng

(57) ABSTRACT

A driver for driving a load over a transmission line, such as driving the magnetic head of a hard disk drive. The driver includes a signal switch for switching the signal to the load during a signal period, and a boost switch for boosting the signal during a boost period, so as to decrease rise time of the signal at the load by deliberately injecting an overshoot. A switchable protection device protects the signal switch and the boost switch. The protection device includes a reflection-suppression switch which is pulsed during a time corresponding to the expected return of a reflection corresponding to the overshoot signal, so as to force the protection device into saturation mode. Since the protection device is in the saturation mode during the return reflection of the boost signal, the returned reflection sees a matched impedance and thus reduces a re-reflection back to the load.

29 Claims, 10 Drawing Sheets

$T_B < T_p \leq 2T_D$
$T_r \leq T_B$
$T_D$ IS TRANSMISSION - LINE PROPAGATION DELAY

US 7,848,038 B1

BOOSTED WRITE DRIVER FOR TRANSMISSION LINE WITH REDUCTION IN PARASITIC EFFECT OF PROTECTION DEVICES

CROSS-REFERENCE TO RELATED APPLICATION

This application claims the benefit of U.S. Provisional Patent Application No. 60/826,260, filed Sep. 20, 2006, the contents of which are hereby incorporated by reference as if fully stated herein.

FIELD OF THE INVENTION

The present invention relates to a driver for a transmission line in which the driver includes protection devices for the switches therein, and particularly relates to a driver in which the parasitic effects of such protection devices are reduced.

BACKGROUND OF THE INVENTION

In the continuing effort to increase the storage capacity of hard disk drives, one area of development has focused on decreasing the rise time (or, equivalently, increasing the "slew rate") of the write current applied to the magnetic head. Generally speaking, if the rise time can be decreased, then it is possible to record more data bits per second on the hard disk drive, resulting in increased storage capacity.

One way in which rise time has been increased is through a preamplifier drive circuit that deliberately boosts the write current above the target value, for a short boost period at the beginning of the write period. During the boost period, the drive circuit provides additional current so as to cause a deliberate (but short) overshoot in the amount of current supplied to the write head. This increased current during the boost period decreases rise time at the write head, and permits increased storage capacity of the disk.

FIG. 1 is a simplified circuit showing this effect, and FIG. 2 is a timing diagram for the FIG. 1 circuitry. In this regard, the invention was developed in connection with a preamplifier for the write head of a hard disk drive, which is an inductive load. It will be appreciated, however, that the invention has application to drive circuits for transmission lines generally, regardless of whether the driven load is or is not the head of a hard disk drive, and regardless of whether the driven load is or is not an inductive load. Accordingly, and unless otherwise noted, this specification will describe the load as a purely resistive load, and the transmission line as any generalized transmission line.

Turning to FIG. 1, a load $R_L$ at the end of a transmission line $T_L$ is driven by a drive circuit 1. Drive circuit 1 includes a pair of series-connected current sources $I_W$ connected between positive supply voltage $V_{DD}$ and negative supply voltage $V_{EE}$. In the case of driving the head of a hard disk drive, these current sources provide a write current. Switch $S_2$ controls current supplied by the first current source $I_W$, so as to supply a positive-going current to the load $R_L$, and switch $S_4$ controls current supplied by the second current source $I_W$, so as to supply a negative-going current to load $R_L$. Switch $S_1$ is operated for a short boost period $T_B$ during a positive-going signal period, and switch $S_3$ is operated for a short boost period $T_B$ during a negative-going signal period. A termination resistor $R_T$ is provided for impedance-matching to the impedance $Z_0$ of transmission line $T_L$. (B) signifies a connector between drive circuitry 1 and the transmission line $T_L$.

FIG. 2 is a timing diagram that depicts operation of drive circuitry 1 in FIG. 1. Because of pervious operations in the circuitry, the timing diagram of FIG. 2 commences at a state in which switches $S_1$, $S_2$ and $S_3$ are open, and switch $S_4$ is closed. In this state, the voltage at connector (B) has reached a steady state, corresponding to a desired negative-going current $I_L$ flowing through load $R_L$.

At this time, a positive-going current is needed for load $R_L$. Accordingly, switch $S_4$ is opened, and both of switches $S_1$ and $S_2$ are closed. Switch $S_2$ causes current from current source $I_W$ to flow, and switch $S_1$ causes a boosted current to flow. As a consequence, the voltage at connector (B) rises almost immediately to $V_{DD}$, which corresponds to a voltage that is $V_{DS}$ higher than the ultimate driving voltage that is needed.

Switch $S_1$ is maintained in the closed state for a boost period $T_B$ that is shorter than the delay time $T_D$ of transmission line $T_L$. At the expiration of the boost period $T_B$, switch $S_1$ is opened, which allows voltage at connector (B) to fall to the needed voltage.

Meanwhile, the applied voltage travels down the transmission line $T_L$ where, after the propagation delay of the transmission line, it appears as a boosted current across the load $R_L$. Likewise, after the boost period $T_B$ has expired, current $I_L$ through the load $R_L$ decreases to the intended target of $I_W$.

As a consequence of this operation, there is a decrease in the rise time of current $I_L$ through load $R_L$, as measured from its previous value of $-I_W$ to the target value of $+I_W$ is decreased, relative to the rise time without the boosted signal. This permits higher density recording on a hard disk drive.

In practical devices, switches $S_1$ through $S_4$ are implemented in MOS or bipolar transistor fabrication, and such transistors cannot withstand the large voltage swings that occur in the transition between positive-going and negative-going current flow. For example, in the instant between the time where $S_4$ opens and $S_2$ closes, switch $S_2$ will see the entire voltage drop of $(V_{EE}-V_{DD})$ across it. MOS or bipolar transistor devices cannot withstand such a large voltage across them without damage.

Accordingly, in real-world devices, a protection device is provided for these switches. FIG. 3 illustrates the use of such a protection device.

FIG. 3 shows only the upper half of driver circuitry 2, which is largely similar to the upper half of driver circuitry 1 except for the introduction of protection device $M_1$. The protection device $M_1$ is ordinarily a large p-type device, with its gate tied to $V_{SS}$. The $M_1$ protection device operates as follows. Consider a situation in which the voltage at connector (B) has been operating at $V_{DD}$, corresponding to a positive-flowing current, and a transition to a negative-flowing current is desired. In this case, the voltage at connector (B) switches from $V_{DD}$ to $V_{EE}$ (approximately). Without protection device $M_1$, switches $S_1$ and $S_2$ would see the entire voltage swing of $(V_{EE}-V_{DD})$, which might tend to damage the devices. On the other hand, because of the presence of protection device $M_1$ and because its gate is tied to $V_{SS}$, the voltage at the source of protection device $M_1$ (corresponding to point (A)) cannot go below $V_{SS}$. Thus, the voltage across protection device $M_1$ is acceptable, and the voltage across switches $S_1$ and $S_2$ is also acceptable.

While the protection device $M_1$ is a desirable addition, its introduction into the drive circuitry causes difficulties. Specifically, the protection device $M_1$ is a large device since there is an intention to provide large currents (such as 60 milliamps) to the load $R_L$. Because the protection device $M_1$ is a large device, its parasitic capacitance $C_1$ is also large. During the boost period $T_B$, switch $S_1$ is on and the voltages at points (A) and (B) are both raised to $V_{DD}$, which drives the protection device $M_1$ in its linear region. After the boost period $T_B$, switch $S_1$ opens and the voltage at point (B) drops to a value that depends on the impedance $Z_0$ of the transmission line $T_L$ and on the current $I_W$ provided by the current source. For typical large values, such as a current $I_W$=40 milliamps to 60 milliamps and impedance $Z_0$=approximately 100 ohms, the voltage at point (B) is around 2 volts. Meanwhile, protection device $M_1$ is still in its linear region. Thus, when a reflection from the load $R_L$ arrives back from the transmission line at point (B), it sees the termination resistor $R_T$ in parallel with resistor $R_{ON}$ (which is the on-resistance of device $M_1$), plus the parasitic capacitance $C_1$. This is no longer a match to the impedance $Z_0$ of the transmission line $T_L$, and thus causes a pulse-like disturbance whose size is $\Gamma \cdot V_{DS}$, as shown in FIG. 2, where "$\Gamma$" is a reflection coefficient. The disturbance is shaped to the same as the boost pulse, and for its part, the disturbance causes an additional re-reflection back to the load $R_L$. This undesirable re-reflection is shown in FIG. 4.

SUMMARY OF THE INVENTION

The present invention addresses the foregoing disadvantageous effect of the prior art, by reducing the parasitic effect of the protection device.

According to one aspect, the invention pulses the gate voltage of the protection device so as to drive the protection device into saturation mode. The pulsing of the protection device occurs at a time when the reflection from the load is expected to arrive back at the driver, but after the boost period has expired.

As a result, since the protection device is driven to saturation during a time when the reflection from the load arrives back at the driver, the device exhibits low parasitic effects, such that the reflection mainly sees only the termination resistance of the driver. Since this is a good match to the impedance of the transmission line, any re-reflection back to the load is largely avoided.

Preferably, the protection device is driven into saturation by the provision of a switch between its gate and source. The switch is timed to operate at a period after the termination of the boost period, but before the arrival of the reflection of the load. If $T_P$ is the time after commencement of the boost period $T_B$, and $T_r$ is the time that the switch is closed, then:

$$T_B < T_P \leq 2T_D$$

$$T_r \leq T_B$$

where $T_D$ is the propagation delay of the transmission line.

The invention is applicable to drivers for a load of any nature over a transmission line of any nature. For example, the invention is applicable to situations where the load is an inductive load (such as the head of a hard disk drive), or where the product of the driving current and the impedance of the transmission line is large.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
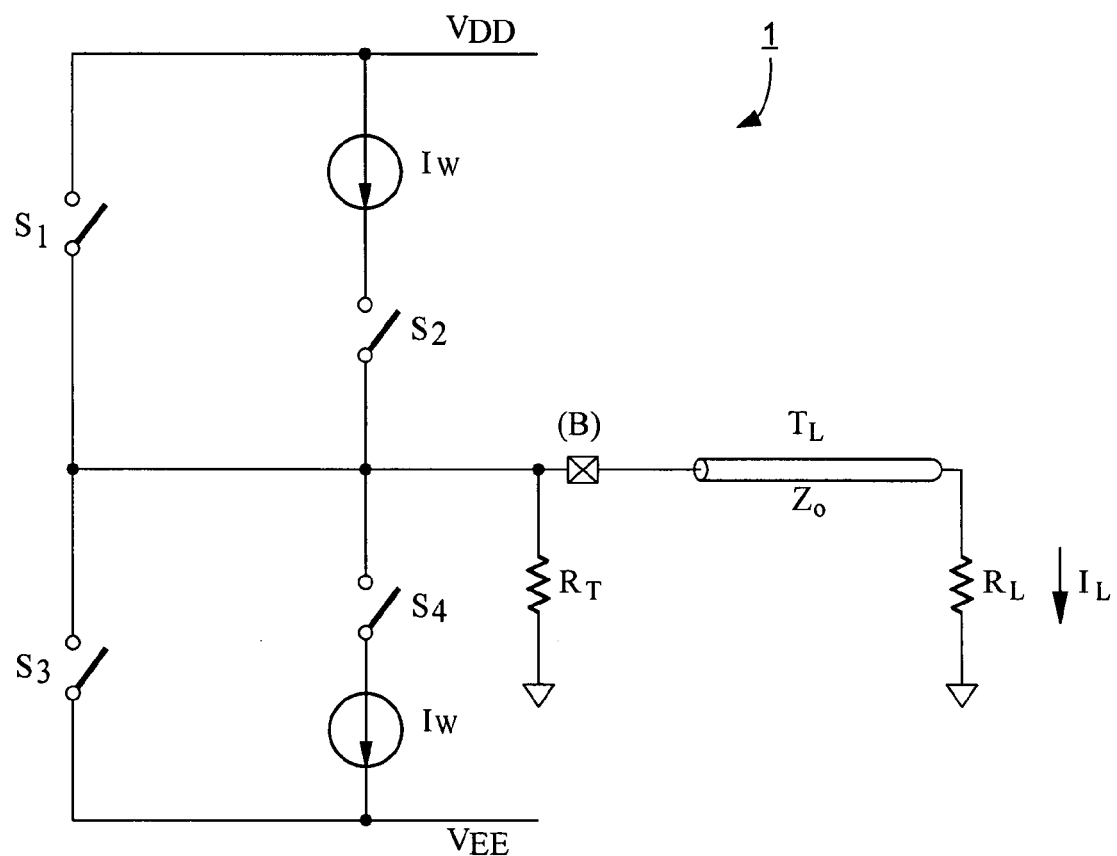
FIG. 1 is a circuit diagram showing a conventional driver for a transmission line, which uses a boost period to decrease rise time.
Figure 2:
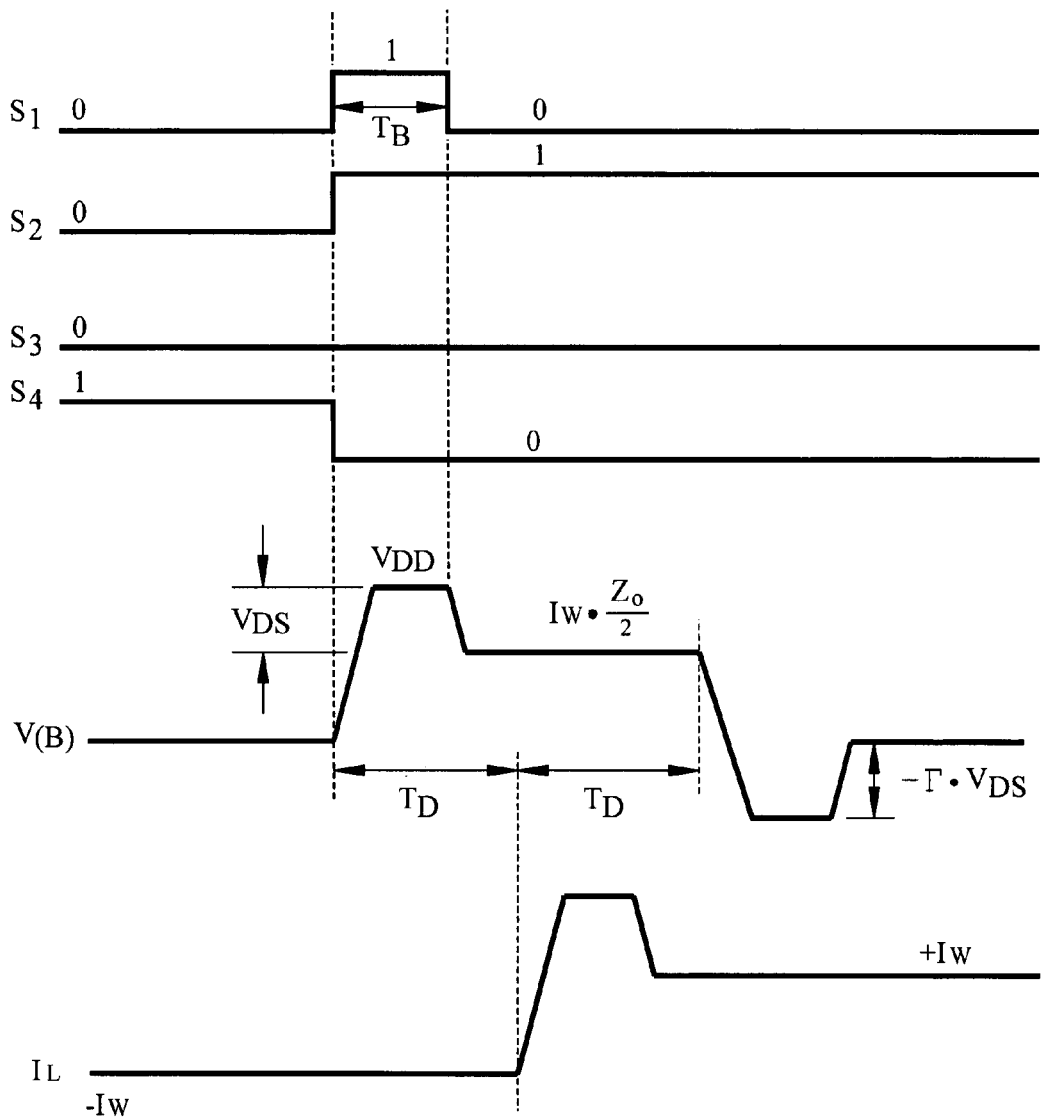
FIG. 2 is a timing diagram for the circuitry of FIG. 1.
Figure 3:
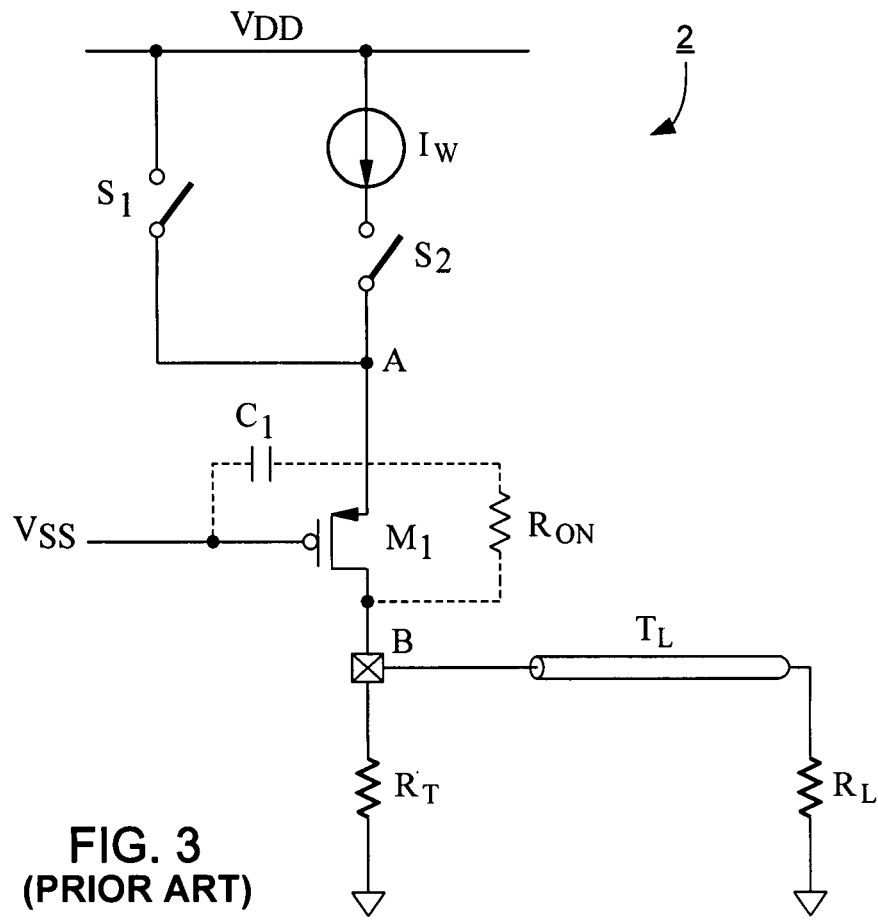
FIG. 3 is a circuit diagram showing use of a protection device for protecting the semiconductor switches in a conventional driver circuit.
Figure 4:
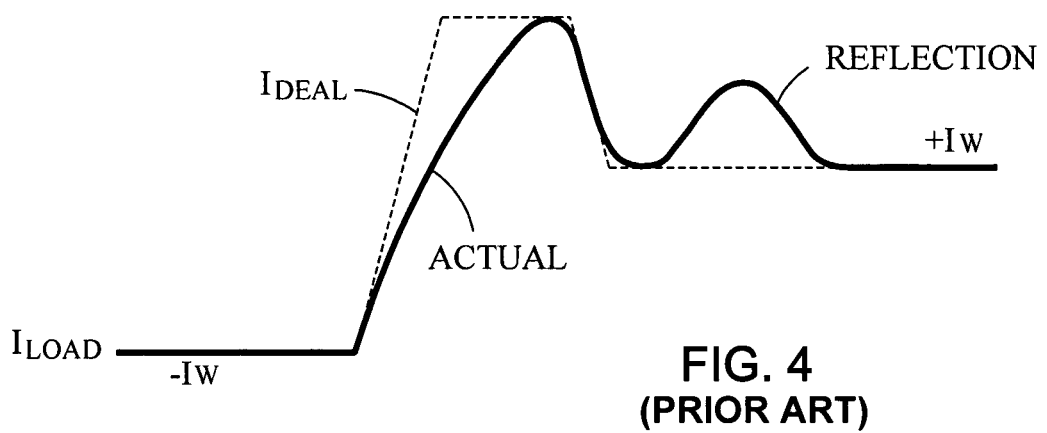
FIG. 4 illustrates a waveform for the conventional circuitry of FIG. 3.
Figure 5:
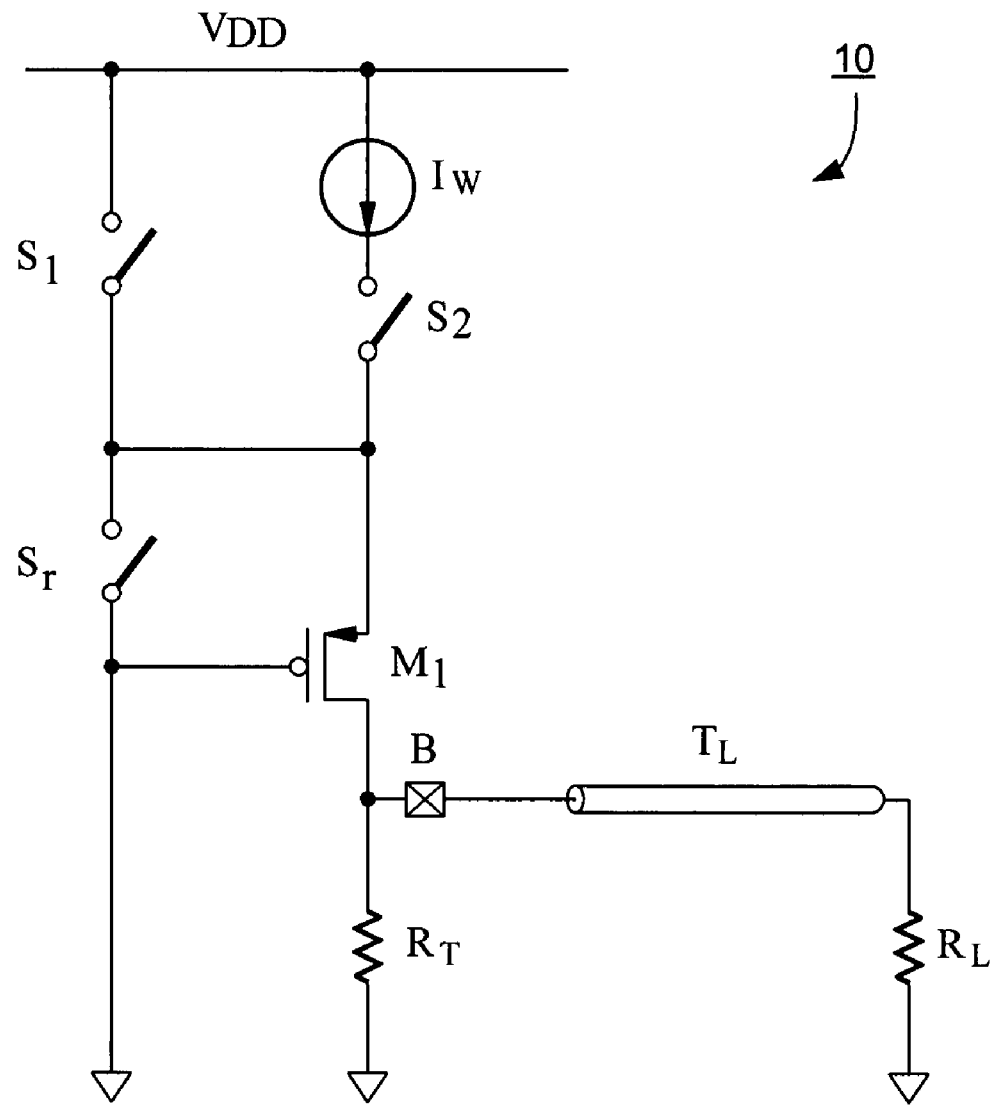
FIG. 5 is a circuit diagram showing a first embodiment of the invention.

FIG. 5 is a view showing a circuit diagram according to a first embodiment of the invention. For purposes of simplified explanation, the circuit diagram of FIG. 5 shows only the upper portion of driver circuitry 10. It will be appreciated that similar circuitry is provided for a lower portion of driver circuitry 10, constituting a section that leads to voltage $V_{EE}$.

As shown in FIG. 5, drive circuitry 10 drives a load $R_L$ over a transmission line $T_L$. Drive circuitry 10 includes a connector (B) for connection to the transmission line. In one example, the load is an inductive load such as a magnetic head of a hard disk drive, and the transmission line $T_L$ is twisted pair, coaxial cabling, flat bonded, flat ribbon, or other suitable transmission line.

The drive circuit includes a termination resistor $R_T$ whose impedance preferably matches the impedance $Z_0$ of the transmission line.

Drive circuitry 10 includes a current source $I_W$ connected between $V_{DD}$ and $V_{SS}$ through signal switch $S_2$ which is a semiconductor switch. Signal switch $S_2$ controls application of positive-going current to the load $R_L$ during a signal period. Boost switch $S_1$ is also a semiconductor switch and is likewise connected between $V_{DD}$ and $V_{SS}$. Boost switch $S_1$ controls a boost current during a boost period $T_B$.

A semiconductor protection device $M_1$ is provided between semiconductor switches $S_1$ and $S_2$ and connector (B), so as to protect semiconductor switches $S_1$ and $S_2$ from damage due to large voltage swings. Protection device $M_1$ may be a BJT (bipolar junction transistor) or a MOS device (PMOS or NMOS). In the example of this embodiment, protection device $M_1$ is a PMOS device whose source is connected to semiconductor switches $S_1$ and $S_2$ and whose drain is connected to connector (B). The gate of protection device $M_1$ is connected to $V_{SS}$ (which may be AC ground), and is also connected to its source through a semiconductor switch $S_r$ which functions as a reflection-suppression switch. The current characteristics of protection device $M_1$ are ordinarily selected in correspondence to the amount of current being driven to load $R_L$.

Figure 6:
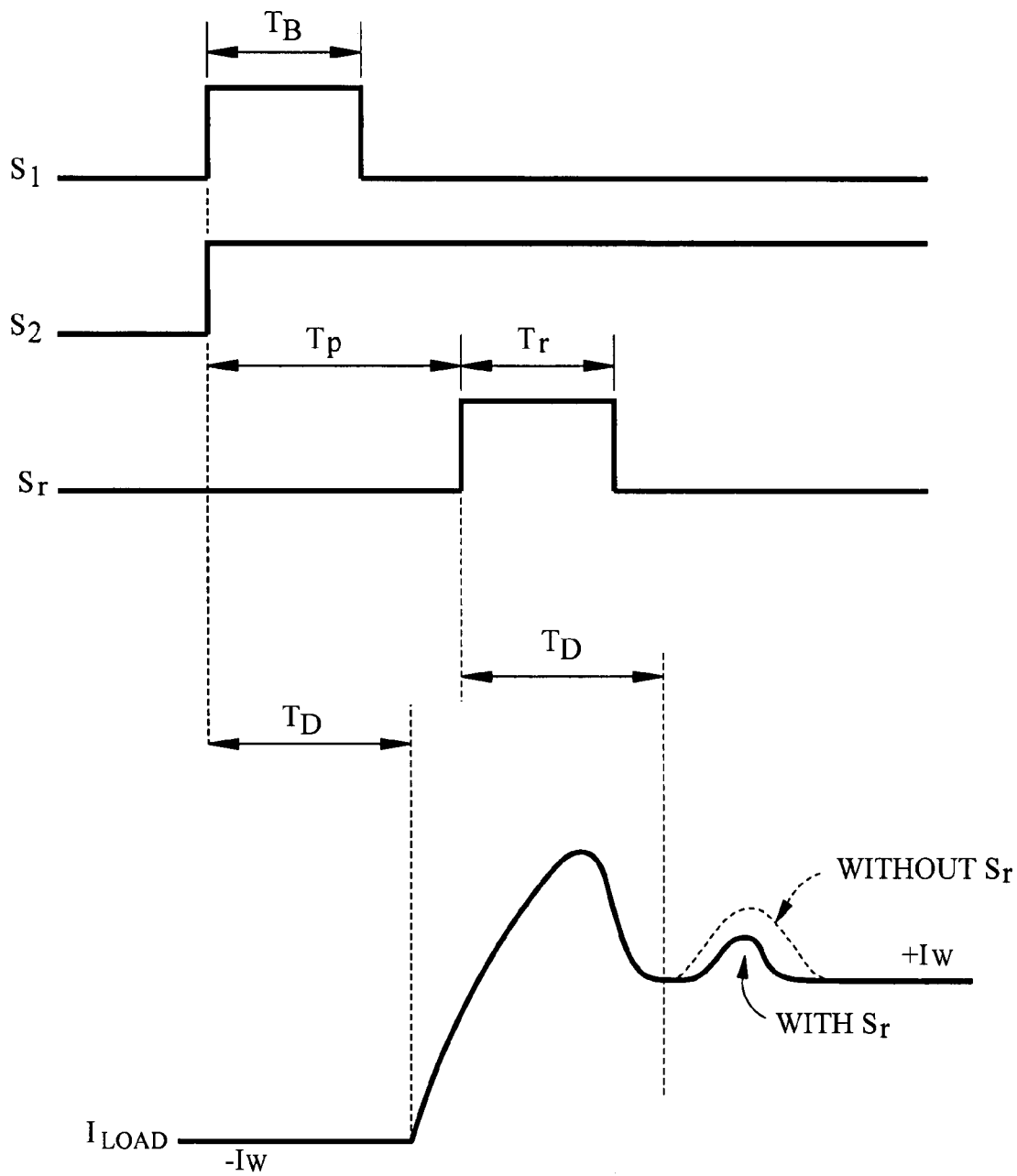
FIG. 6 is a timing diagram showing the effect of the circuit diagram of FIG. 5.

The operation of FIG. 5 is shown in the timing diagram and waveforms depicted in FIG. 6. As shown in FIG. 6, at the commencement of the signal period, boost switch $S_1$ and signal switch $S_2$ are both closed. The boost switch remains closed for a boost period $T_B$, after which the boost switch opens. Signal switch $S_2$ remains closed for the duration of the signal period. After a time $T_P$, reflection-suppression switch $S_r$ is closed and remains closed for a reflection-suppression period $T_r$. In words, the reflection-suppression switch $S_r$ is closed after the boost period is completed, and remains closed during a time of the expected return of a reflection of load $R_L$. Thus, the time $T_P$ at which reflection-suppression switch $S_r$ is closed should satisfy the following condition:

$$T_B < T_P \leq 2T_D,$$

which ensures that the reflection-suppression switch $S_r$ is closed after the boost period has been completed but before the reflection returns from load $R_L$. In addition, the reflection-suppression switch $S_r$ should remain closed for at least a portion of the reflection of the boost signal. Thus, the time $T_r$ during which the reflection-suppression switch Sr remains closed should satisfy the condition $$T_r \leq T_B$$

which ensures that the reflection-suppression switch $S_r$ remains closed during at least part of the time that the reflected boost signal is returned from the load, for a duration that corresponds generally to the duration of the boost period.

Because the reflection-suppression switch $S_r$ is closed during the reflection of the boost signal, protection device $M_1$ is operated in the fully saturated mode in which its source is shorted to its gate. As a consequence, the reflected boost signal "sees" a very low parasitic capacitance $C_P$ and a very low parasitic ON resistance $R_{ON}$. Thus, the reflected signal primary "sees" the termination resistor $R_T$, which provides a good match to the impedance of transmission line $T_L$ and largely reduces any re-reflection of the boost signal.

This effect is shown in the waveform of $I_{LOAD}$ in FIG. 6. This waveform shows the current $I_{LOAD}$ flowing through the load $R_L$ as a function of time. As seen in FIG. 6, the current $I_{LOAD}$ shows an accelerated change and decreased rise time in switching away from a negative current $-I_W$ toward a positive current flow $+I_W$, due to the boost deliberately injected by boost switch $S_1$. Load $R_L$ sees this at a delayed time corresponding to the propagation delay $T_D$ of the transmission line. Naturally, the boost will be reflected back from the load $R_L$ along the transmission line, where it encounters the drive circuitry at connector (B). Impedance mismatches cause a re-reflection. Without the effect of reflection-suppression switch $S_r$, the load would experience a large re-reflection, as shown by the dotted line in the waveform of FIG. 6. However, because of the effect of reflection-suppression switch $S_r$ in driving protection device $M_1$ into saturation mode, there is very little impedance mismatch, and a consequently smaller re-reflection.

Figure 7:
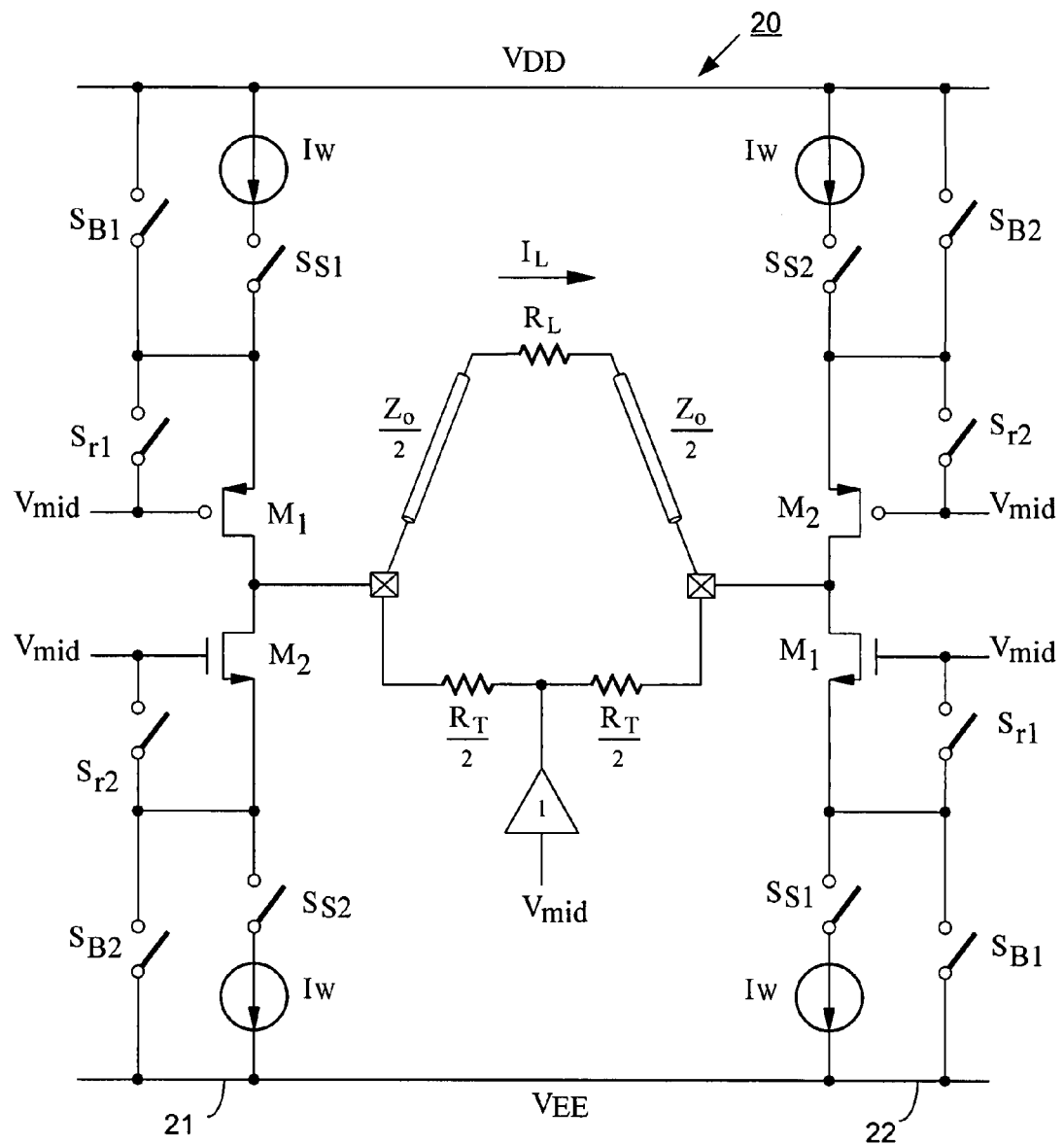
FIG. 7 is a circuit diagram showing a second embodiment of the invention.

FIG. 7 shows a second embodiment of the invention, in the form of a simplified circuit for driving a differential output along a pair of transmission lines that differentially drive a load $R_L$. The transmission lines may or may not have the same characteristics, and indeed it is common for the transmission lines to have different lengths. Load $R_L$ is depicted as a resistive load, but in general it can be any load including an inductive load, such as a magnetic head for a hard disk drive.

The differential drive circuitry 20 shown in FIG. 7 includes a pair of mirror-image halves 21 and 22. With respect to half 21, current source $I_W$ is connected through a semiconductor signal switch $S_{S1}$ and protection device $M_1$ to a connector for one of the pair of transmission lines. A semiconductor boost switch $S_{B1}$ is also connected through protection device $M_1$ to the connector to the transmission line. Protection device $M_1$ is a semiconductor protection device, preferably a large p-type device, which protects both of semiconductor switches $S_{B1}$ and $S_{S1}$ from large voltage swings. The source of protection device $M_1$ is connected through a reflection-suppression switch $S_{r1}$ to $V_{SS}$, to which the gate of protection device $M_1$ is also connected.

Like circuitry is provided for negative-going current for half 21. Commencing from voltage $V_{EE}$ of current source $I_W$ there are semiconductor switch $S_{S2}$, protection device $M_2$, semiconductor boost switch $S_{B2}$ and reflection-suppression switch $S_{r2}$.

Half 22 is a mirror image of half 21, and a description thereof is omitted in the interest of brevity.

Operation of the switches shown in FIG. 7 conforms to the operation of the switches in the first embodiment, whose timing diagram is shown in FIG. 6. Thus, the semiconductor signal switches are closed at the same time as the semiconductor boost switches, and the boost switches remained closed for a short boost time $T_B$ after which they are opened. The semiconductor reflection switches are closed after the boost period $T_B$ but before the expected return of a reflection from the transmission line, and the semiconductor reflection-switches remain closed for a time corresponding generally to the boost time $T_B$. Each half 21 and 22 operates to cause negative-going and positive-going current to flow through load $R_L$ through its respective transmission line, and halves 21 and 22 operate complementarily to each other so as to enhance this effect through differential driving of load $R_L$.

Referring now to FIGS. 8A-8G, various exemplary implementations of the present invention are shown. Referring to FIG. 6A, the present invention may be embodied as a boosted write driver in a hard disk drive 500. The present invention may implement either or both signal processing and/or control circuits, which are generally identified in FIG. 8A at 502. In some implementations, signal processing and/or control circuit 502 and/or other circuits (not shown) in HDD 500 may process data, perform coding and/or encryption, perform calculations, and/or format data that is output to and/or received from a magnetic storage medium 506.

HDD 500 may communicate with a host device (not shown) such as a computer, mobile computing devices such as personal digital assistants, cellular phones, media or MP3 players and the like, and/or other devices via one or more wired or wireless communication links 508. HDD 500 may be connected to memory 509, such as random access memory (RAM), a low latency nonvolatile memory such as flash memory, read only memory (ROM) and/or other suitable electronic data storage.

Figure 8A:
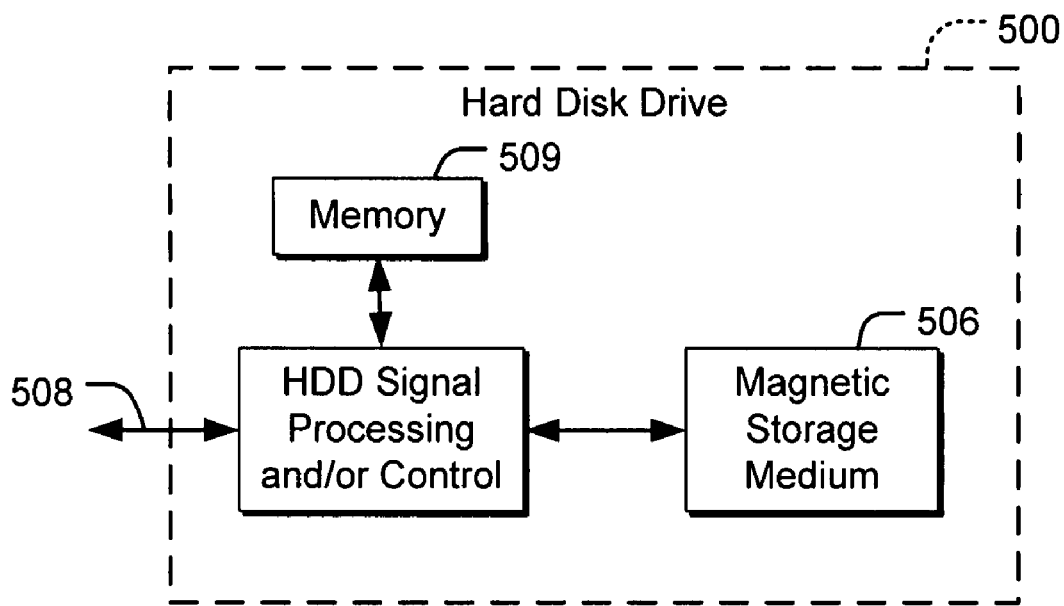
FIG. 8A is a block diagram showing an embodiment of the invention in a hard disk drive.
Figure 8B:
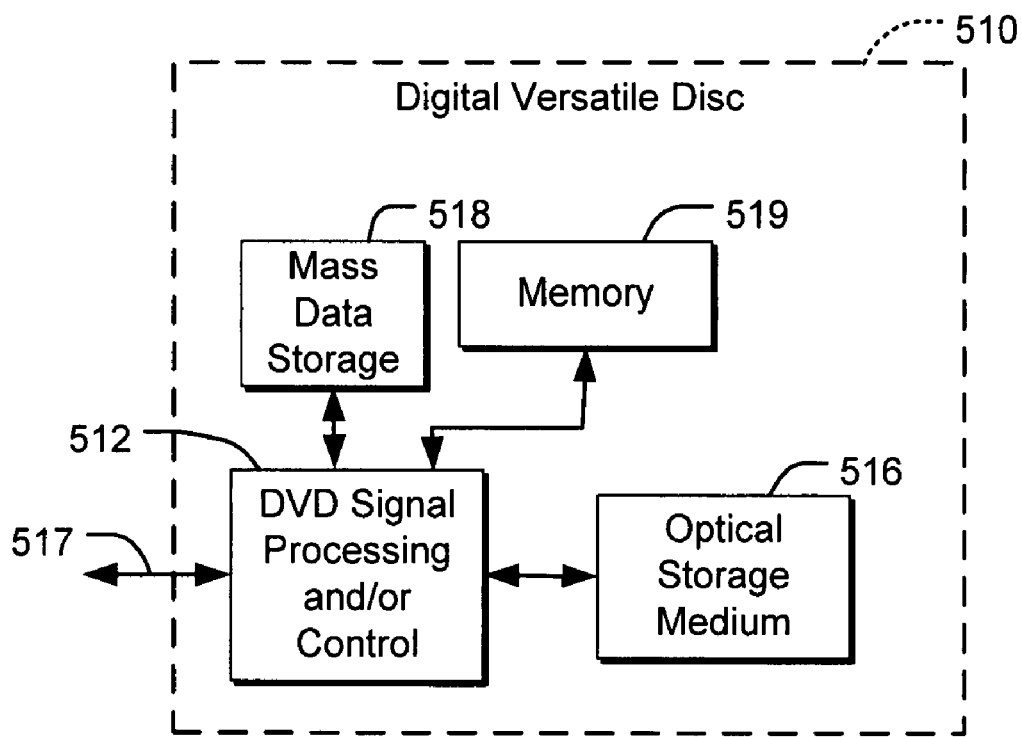
FIG. 8B is a block diagram of the invention in a DVD drive.

Referring now to FIG. 8B, the present invention may be embodied as a boosted write driver in a digital versatile disc (DVD) drive 510. The present invention may implement either or both signal processing and/or control circuits, which are generally identified in FIG. 8B at 512, and/or mass data storage 518 of DVD drive 510. Signal processing and/or control circuit 512 and/or other circuits (not shown) in DVD 510 may process data, perform coding and/or encryption, perform calculations, and/or format data that is read from and/or data written to an optical storage medium 516. In some implementations, signal processing and/or control circuit 512 and/or other circuits (not shown) in DVD 510 can also perform other functions such as encoding and/or decoding and/or any other signal processing functions associated with a DVD drive.

DVD drive 510 may communicate with an output device (not shown) such as a computer, television or other device via one or more wired or wireless communication links 517. DVD 510 may communicate with mass data storage 518 that stores data in a nonvolatile manner. Mass data storage 518 may include a hard disk drive (HDD) such as that shown in FIG. 8A. The HDD may be a mini HDD that includes one or more platters having a diameter that is smaller than approximately 1.8". DVD 510 may be connected to memory 519, such as RAM, ROM, low latency nonvolatile memory such as flash memory, and/or other suitable electronic data storage.

Figure 8C:
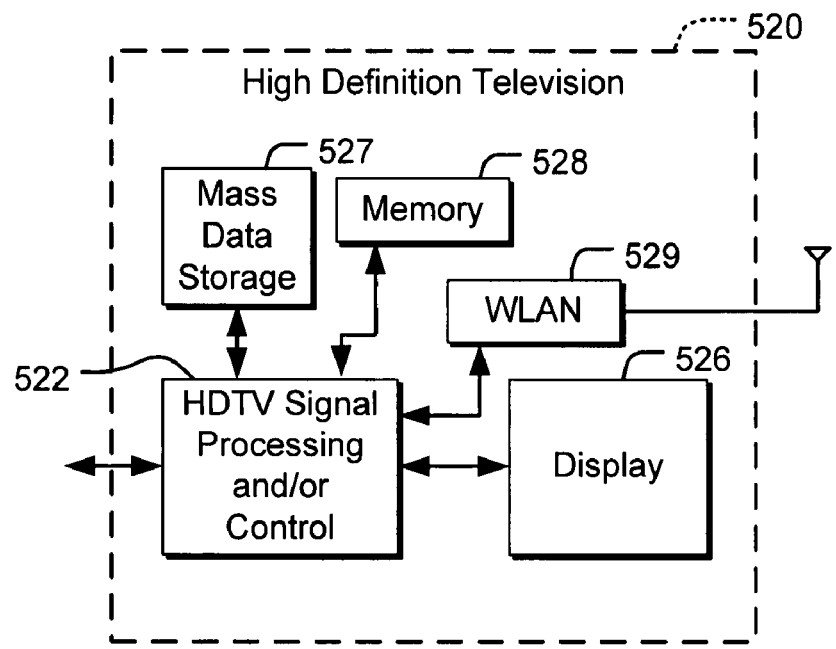
FIG. 8C is a block diagram of the invention in a high definition television (HDTV).

Referring now to FIG. 8C, the present invention may be embodied as a boosted write driver in a high definition television (HDTV) 520. The present invention may implement either or both signal processing and/or control circuits, which are generally identified in FIG. 8C at 522, a WLAN interface and/or mass data storage of the HDTV 520. HDTV 520 receives HDTV input signals in either a wired or wireless format and generates HDTV output signals for a display 526. In some implementations, signal processing circuit and/or control circuit 522 and/or other circuits (not shown) of HDTV 520 may process data, perform coding and/or encryption, perform calculations, format data and/or perform any other type of HDTV processing that may be required.

HDTV 520 may communicate with mass data storage 527 that stores data in a nonvolatile manner such as optical and/or magnetic storage devices. At least one HDD may have the configuration shown in FIG. 8A and/or at least one DVD may have the configuration shown in FIG. 8B. The HDD may be a mini HDD that includes one or more platters having a diameter that is smaller than approximately 1.8". HDTV 520 may be connected to memory 528 such as RAM, ROM, low latency nonvolatile memory such as flash memory and/or other suitable electronic data storage. HDTV 520 also may support connections with a WLAN via a WLAN network interface 529.

Figure 8D:
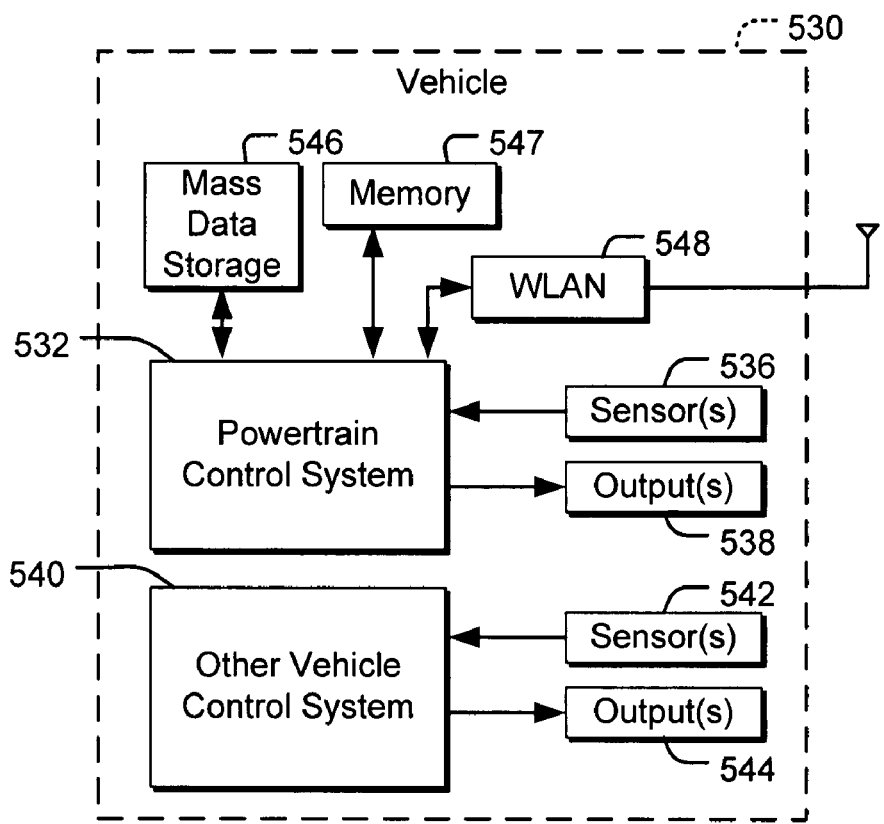
FIG. 8D is a block diagram of the invention in a vehicle control system.

Referring now to FIG. 8D, the present invention may be embodied as a boosted write driver in a control system of a vehicle 530, a WLAN interface and/or mass data storage of the vehicle control system. In some implementations, the present invention implements a powertrain control system 532 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 540 of vehicle 530. Control system 540 may likewise receive signals from input sensors 542 and/or output control signals to one or more output devices 544. In some implementations, control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 532 may communicate with mass data storage 546 that stores data in a nonvolatile manner. Mass data storage 546 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Powertrain control system 532 may be connected to memory 547 such as RAM, ROM, low latency nonvolatile memory such as flash memory and/or other suitable electronic data storage. Powertrain control system 532 also may support connections with a WLAN via a WLAN network interface 548. The control system 540 may also include mass data storage, memory and/or a WLAN interface (all not shown).

Figure 8E:
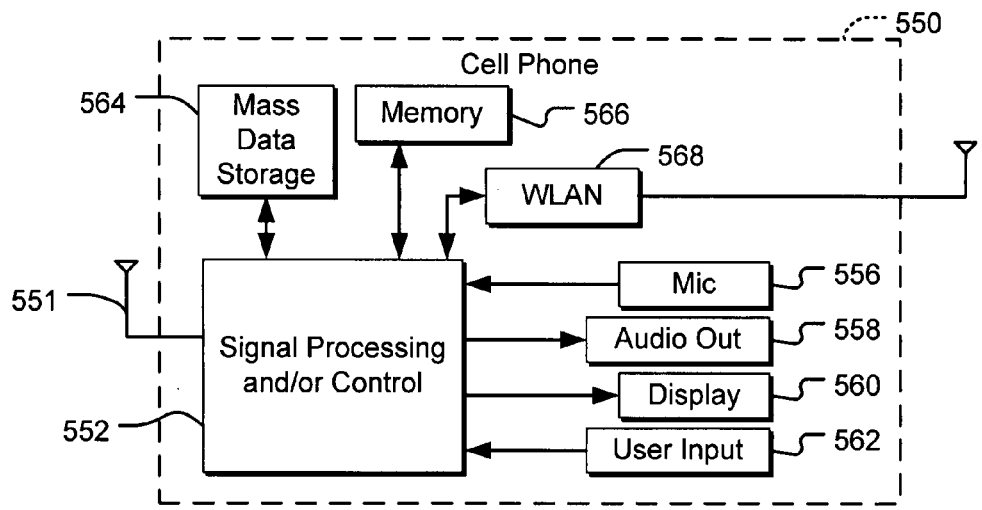
FIG. 8E is a block diagram of the invention in a cellular or mobile phone.

Referring now to FIG. 8E, the present invention may be embodied as a boosted write driver in a cellular phone 550 that may include a cellular antenna 551. The present invention may implement either or both signal processing and/or control circuits, which are generally identified in FIG. 8E at 552, a WLAN interface and/or mass data storage of the cellular phone 550. In some implementations, cellular phone 550 includes a microphone 556, an audio output 558 such as a speaker and/or audio output jack, a display 560 and/or an input device 562 such as a keypad, pointing device, voice actuation and/or other input device. Signal processing and/or control circuits 552 and/or other circuits (not shown) in cellular phone 550 may process data, perform coding and/or encryption, perform calculations, format data and/or perform other cellular phone functions.

Cellular phone 550 may communicate with mass data storage 564 that stores data in a nonvolatile manner such as optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Cellular phone 550 may be connected to memory 566 such as RAM, ROM, low latency nonvolatile memory such as flash memory and/or other suitable electronic data storage. Cellular phone 550 also may support connections with a WLAN via a WLAN network interface 568.

Figure 8F:
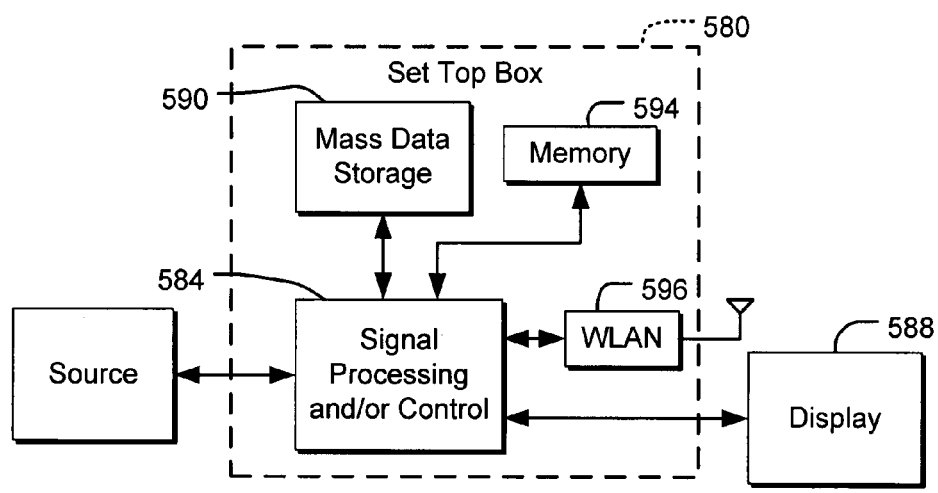
FIG. 8F is a block diagram of the invention in a set-top box (STB).

Referring now to FIG. 8F, the present invention may be embodied as a boosted write driver in a set top box 580. The present invention may implement either or both signal processing and/or control circuits, which are generally identified in FIG. 8F at 584, a WLAN interface and/or mass data storage of the set top box 580. Set top box 580 receives signals from a source such as a broadband source and outputs standard and/or high definition audio/video signals suitable for a display 588 such as a television and/or monitor and/or other video and/or audio output devices. Signal processing and/or control circuits 584 and/or other circuits (not shown) of the set top box 580 may process data, perform coding and/or encryption, perform calculations, format data and/or perform any other set top box function.

Set top box 580 may communicate with mass data storage 590 that stores data in a nonvolatile manner. Mass data storage 590 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Set top box 580 may be connected to memory 594 such as RAM, ROM, low latency nonvolatile memory such as flash memory and/or other suitable electronic data storage. Set top box 580 also may support connections with a WLAN via a WLAN network interface 596.

Figure 8G:
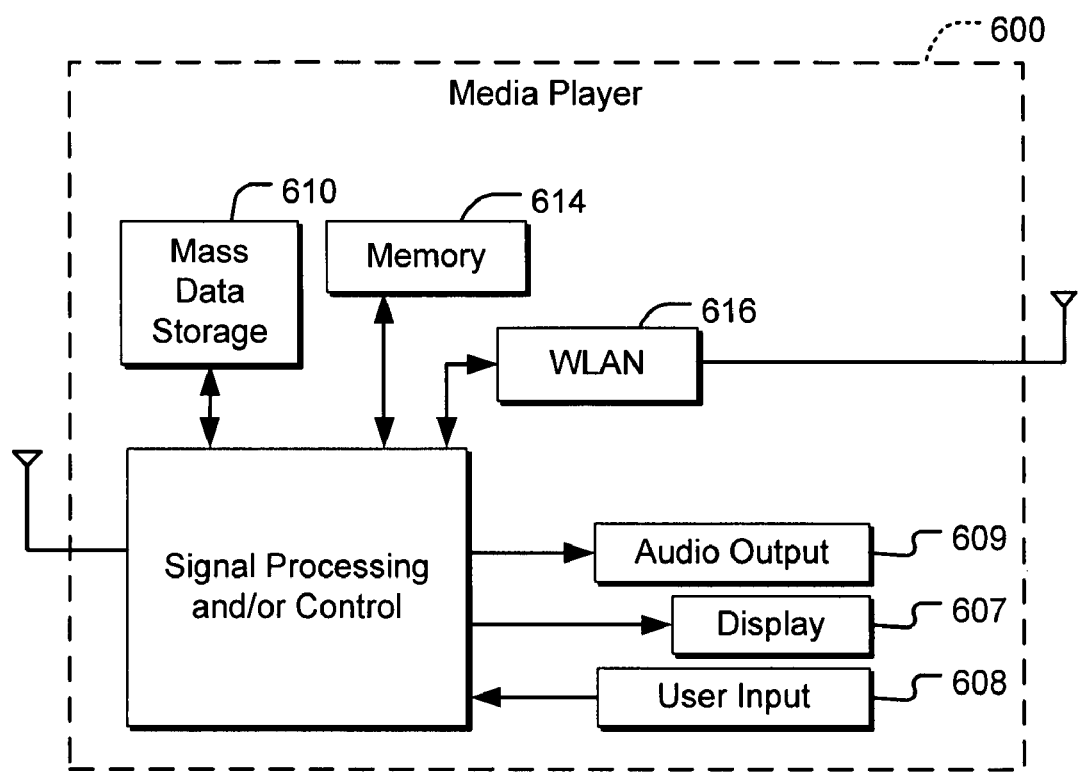
FIG. 8G is a block diagram of the invention in a media player.

Referring now to FIG. 8G, the present invention may be embodied as a boosted write driver in a media player 600. The present invention may implement either or both signal processing and/or control circuits, which are generally identified in FIG. 8G at 604, a WLAN interface and/or mass data storage of the media player 600. In some implementations, media player 600 includes a display 607 and/or a user input 608 such as a keypad, touchpad and the like. In some implementations, media player 600 may employ a graphical user interface (GUI) that typically employs menus, drop down menus, icons and/or a point-and-click interface via display 607 and/or user input 608. Media player 600 further includes an audio output 609 such as a speaker and/or audio output jack. Signal processing and/or control circuits 604 and/or other circuits (not shown) of media player 600 may process data, perform coding and/or encryption, perform calculations, format data and/or perform any other media player function.

Media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Media player 600 may be connected to memory 614 such as RAM, ROM, low latency nonvolatile memory such as flash memory and/or other suitable electronic data storage. Media player 600 also may support connections with a WLAN via a WLAN network interface 616. Still other implementations in addition to those described above are contemplated.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A driver for a load driven through a transmission line, comprising:
    a connection to the transmission line;
    a signal switch configured to switch a signal to the load;
    a boost switch configured to boost the signal to the load during a boost period;
    a protection device configured to protect both the signal switch and the boost switch from damage caused by large voltage swings during switching operations; and
    a reflection-suppression switch configured to switch the protection device to a saturation mode during a reflection-suppression period.

2. A driver according to claim 1, wherein the reflection-suppression period commences after the boost period but before a reflection returns from the load over the transmission line, and wherein the reflection-suppression period continues for a duration corresponding generally to the duration of the boost period.

3. A driver according to claim 2, wherein the following conditions are satisfied:

$$T_B < T_P \leq T_D; \text{ and}$$

$$T_r \leq T_B$$

where $T_B$ is the boost period, $T_P$ is a time for commencement of the reflection-suppression period after commencement of the boost period, $T_D$ is the propagation delay of the transmission line, and $T_r$ is the reflection suppression period.

4. A driver according to claim 1, wherein the protection device is comprised of a PMOS device having (i) a source connected to the signal switch and to the boost switch, (ii) a drain connected to the connection, and (iii) a gate connected to AC ground; and
    wherein the reflection-suppression switch is connected between the source and the gate of the PMOS device.

5. A driver according to claim 1, further comprising a termination resistor connected between the connection and AC ground.

6. A driver according to claim 1, wherein the load is an inductive load.

7. A driver according to claim 6, wherein the inductive load is a magnetic head for a hard disk driver, and wherein the driver comprises a pre-amplifier for driving the magnetic head.

8. A driver according to claim 1, further comprising first and second drivers, wherein the first driver drives the load with positive-going current and the second driver drives the load with negative-going current.

9. A driver according to claim 8, wherein the protection device of the first driver is comprised of a PMOS device, and the protection device of the second driver is comprised of an NMOS device.

10. A driver according to claim 8, further comprising third and fourth drivers, arranged in mirror-image to the first and second drivers, for differential driving of the load through first and second transmission lines.

11. A driver according to claim 10, wherein the protection devices of the first and third drivers are each comprised of a PMOS device, and the protection devices of the second and fourth drivers are each comprised of an NMOS device.

12. A method for driving a load through a transmission line by a driver that comprises a connection to the transmission line, a signal switch configured to switch a signal to the load, a boost switch configured to boost the signal to the load during a boost period, a protection device configured to protect both the signal switch and the boost switch from damage caused by large voltage swings during switching operations and a reflection-suppression switch configured to switch the protection device to a saturation mode during a reflection-suppression period, wherein the method comprises:
    closing the signal switch and the boost switch while the reflection-suppression switch is open;
    opening the boost switch after a boost interval has expired;
    closing the reflection-suppression switch after the boost period has expired but before a reflection has returned from the load over the transmission line; and
    opening the reflection-suppression switch after a reflection-suppression period whose duration corresponds generally to the duration of the boost period.

13. A method according to claim 12, wherein the reflection-suppression period commences after the boost period but before a reflection returns from the load over the transmission line, and wherein the reflection-suppression period continues for a time corresponding generally to that of the boost period.

14. A method according to claim 13, wherein the following conditions are satisfied:

$$T_B < T_P \leq 2T_D; \text{ and}$$

$$T_r \leq T_B$$

where $T_B$ is the boost period, $T_P$ is a time for commencement of the reflection-suppression period after commencement of the boost period, $T_D$ is the propagation delay of the transmission line, and $T_r$ is the reflection suppression period.

15. A method according to claim 12, wherein the protection device is comprised of a PMOS device having (i) a source connected to the signal switch and to the boost switch, (ii) a drain connected to the connection, and (iii) a gate connected to AC ground; and wherein the reflection-suppression switch is connected between the source and the gate of the PMOS device.

16. A method according to claim 12, wherein the load is an inductive load, and the method further comprises driving of the inductive load.

17. A method according to claim 16, wherein the inductive load is a magnetic head for a hard disk driver, and wherein the driver comprises a pre-amplifier for driving the magnetic head, and the method further comprises preamplified driving of the magnetic head.

18. A method according to claim 12, wherein there are multiple drivers, and the method further comprises differential driving of the load through first and second transmission lines.

19. A driver for a load driven through a transmission line, comprising:
    connection means for connecting to the transmission line;
    signal switching means for switching a signal to the load;
    boost switching means for boosting the signal to the load during a boost period;
    protection device means for protecting both the signal switch and the boost switch from damage caused by large voltage swings during switching operations; and
    reflection-suppression switching means for switching the protection device to a saturation mode during a reflection-suppression period.

20. A driver according to claim 19, wherein the reflection-suppression period commences after the boost period but before a reflection returns from the load over the transmission line, and wherein the reflection-suppression period continues for a duration corresponding generally to the duration of the boost period.

21. A driver according to claim 20, wherein the following conditions are satisfied:

$T_B < T_P \leq 2T_D$; and $T_r \leq T_B$ where $T_B$ is the boost period, $T_P$ is a time for commencement of the reflection-suppression period after commencement of the boost period, $T_D$ is the propagation delay of the transmission line, and $T_r$ is the reflection suppression period.

22. A driver according to claim 19, wherein the protection device means is comprised of a PMOS device having (i) a source connected to the signal switching means and to the boost switching means, (ii) a drain connected to the connection, and (iii) a gate connected to AC ground; and wherein the reflection-suppression switching means is connected between the source and the gate of the PMOS device.

23. A driver according to claim 19, further comprising termination resistor means connected between the connection means and AC ground.

24. A driver according to claim 19, wherein the load is an inductive load.

25. A driver according to claim 24, wherein the inductive load is a magnetic head for a hard disk driver, and wherein the driver comprises a pre-amplifier for driving the magnetic head.

26. A driver according to claim 19, further comprising first and second drivers, wherein the first driver drives the load with positive-going current and the second driver drives the load with negative-going current.

27. A driver according to claim 26, wherein the protection device of the first driver is comprised of a PMOS device, and the protection device of the second driver is comprised of an NMOS device.

28. A driver according to claim 26, further comprising third and fourth drivers, arranged in mirror-image to the first and second drivers, for differential driving of the load through first and second transmission lines.

29. A driver according to claim 28, wherein the protection devices of the first and third drivers are each comprised of a PMOS device, and the protection devices of the second and fourth drivers are each comprised of an NMOS device.

\* \* \* \* \*